April 5, 1960  R. H. STANSBURY  2,931,463
TRAILER TONGUE WHEEL CHOCK
Filed Nov. 7, 1958

Raymond H. Stansbury
INVENTOR.

United States Patent Office 2,931,463
Patented Apr. 5, 1960

2,931,463

TRAILER TONGUE WHEEL CHOCK

Raymond H. Stansbury, Grants Pass, Oreg., assignor of twenty-five percent to Lois M. Gates, Grants Pass, Oreg.

Application November 7, 1958, Serial No. 772,626

1 Claim. (Cl. 188—32)

This invention relates to new and useful improvements in chocks particularly although not necessarily, for the tongue or hitch wheels of trailers of various types, sizes and weights, and has for its primary object to provide, in a manner as hereinafter set forth, novel means for positively preventing the vehicle from rolling in any direction on either level or inclined surfaces.

Another very important object of the present invention is to provide a chock of the aforementioned character which is invertible for use on hard or relatively soft surfaces and which includes novel anchoring means for insuring against slippage on either.

Other objects of the invention are to provide a chock of the character described which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
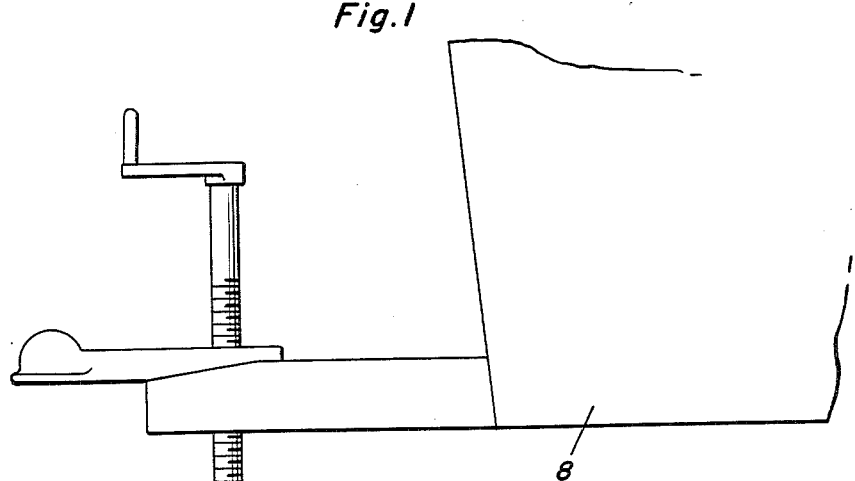
Figure 1 is a view in side elevation, showing a chock constructed in accordance with the present invention in use.
Figure 2:
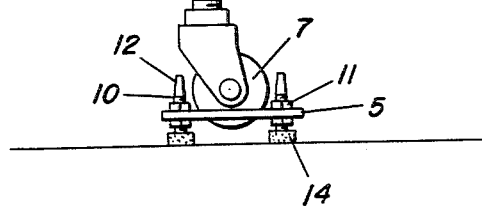
Figure 2 is a plan view of the device.
Figure 3:
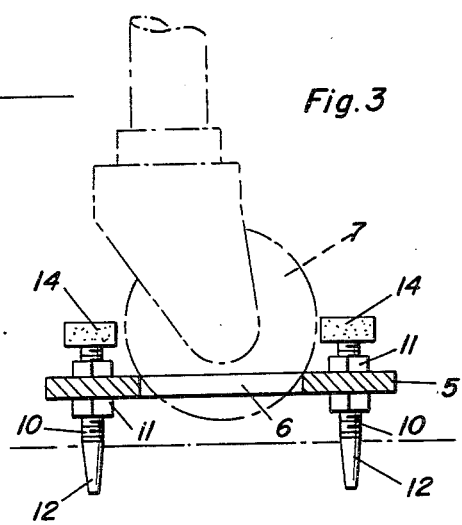
Figure 3 is a vertical longitudinal sectional view.

Referring now to the drawing in detail, it will be seen that the embodiment of the present invention which has been illustrated comprises a substantially rectangular, invertible plate 5 of suitable metal. The plate 5, which may also be of any desired dimensions, has formed longitudinally therein a substantially rectangular opening 6 for the reception of the usual tongue or hitch wheel 7 of a trailer 8.

Figure 4:
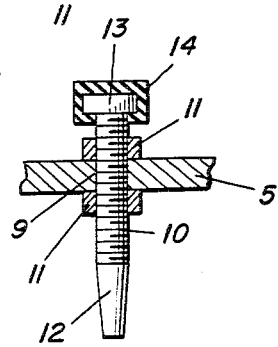
Figure 4 is an enlarged fragmentary view in vertical section through a corner portion of the device.

The corner portions of the plate 5 are provided with holes or openings 9 (see Figure 4) for the reception of threaded anchoring spikes or members 10. The anchoring spikes or members 10 project from both sides of the plate 5 and said spikes have threaded thereon, above and below said plate and engageable therewith, lock nuts 11.

The anchoring spikes 10 terminate at one end in smooth, blunt ground penetrating points 12. On the other ends thereof, the anchoring spikes 10 are provided with heads 13. Caps 14 of rubber or other suitable material are mounted on the heads 13.

It is thought that the use of the device will be readily apparent from a consideration of the foregoing. Briefly, when the chock is to be used on a hard surface of concrete or other material the plate 5 is positioned with the capped, headed ends 13 of the spikes 10 lowermost as seen in Figure 1 of the drawing. The tongue or hitch wheel 7 of the trailer 8 is then lowered into and seats in the opening 6 in the plate 5. Thus, the trailer is firmly secured against rolling in any direction, the rubber caps 14, under the weight of the load on the plate 5, frictionally gripping the concrete or other hard surface. When the chock is to be used on a relatively soft surface such, for example, as the ground, the plate 5 is inverted to bring the end portions 12 of the anchoring spikes 10 lowermost. The wheel 7 is then engaged in the opening 6 and the end portions 12 of the spikes 10 are caused to penetrate the ground in an obvious manner. By loosening the lock nuts 11 the anchoring spikes 10 may be vertically adjusted, if desired, to level or stabilize the plate 5 on inclined, rough or irregular surfaces.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A wheel chock comprising a smooth, flat, elongated, invertible metallic plate including identical opposite sides, said plate having a longitudinally elongated, centrally located opening therein for seatingly receiving a wheel, said plate further having smooth holes in its corner portions, vertical spikes mounted for sliding adjustment in the holes for anchoring the plate on a supporting surface, lock nuts threaded on the spikes above and below the plate for securing said spikes in adjusted position, said spikes extending above and below the invertible plate for anchoring same in either position on the supporting surface, said spikes including points on one end to be embedded in soft surfaces for positively securing the plate against sliding thereon, heads on the other ends of the spikes, and resilient caps on said heads engageable with relatively hard surfaces for frictionally securing the plate against sliding movement thereon.

References Cited in the file of this patent

UNITED STATES PATENTS

| 330,911 | Livingston | Nov. 24, 1885 |
| 344,269 | Gregory | June 22, 1886 |
| 1,355,429 | Sabine et al. | Oct. 12, 1920 |

FOREIGN PATENTS

| 35,784 | Germany | June 12, 1886 |